United States Patent [19]
Lacasse

[11] Patent Number: 5,645,388
[45] Date of Patent: Jul. 8, 1997

[54] CANTILEVER LIFT ASSEMBLY FOR STATIONARY SMALL AIRCRAFT

[76] Inventor: Maurice Lacasse, 310, avenue des Rosiers, Blainville (Québec), Canada, J7C 2Y7

[21] Appl. No.: 539,024

[22] Filed: Sep. 28, 1995

[51] Int. Cl.⁶ .................................................. B66F 7/00
[52] U.S. Cl. ........................................ 414/227; 187/203
[58] Field of Search ...................... 414/227, 228; 187/203, 208, 215; 254/4 R, 47, 134

[56] References Cited

U.S. PATENT DOCUMENTS

| | | | |
|---|---|---|---|
| 3,557,908 | 1/1971 | Villars | 414/227 X |
| 3,907,113 | 9/1975 | Kropelnitski | 414/227 X |
| 4,856,618 | 8/1989 | Isogai | 187/208 |
| 5,386,430 | 1/1995 | Lin | 414/228 |
| 5,398,621 | 3/1995 | Tanaka et al. | 414/228 X |

FOREIGN PATENT DOCUMENTS

| | | | |
|---|---|---|---|
| 45488 | 2/1974 | Australia | 187/215 |
| 2631017 | 11/1989 | France | 187/203 |
| 172469 | 7/1991 | Japan | 414/227 |
| 92060 | 3/1992 | Japan | 414/227 |
| 247172 | 9/1992 | Japan | 414/228 |
| 276799 | 4/1993 | Japan | 414/227 |

*Primary Examiner*—David A. Bucci
*Attorney, Agent, or Firm*—François Martineau

[57] ABSTRACT

A jack-like elevator for use inside a storage hangar, that lifts a small aircraft in cantilevered fashion above the ground so that another small aircraft can be parked underneath it. The elevator includes an upright column, freely standing on an enlarged base plate, and maintained in upright condition by a pair of horizontal diverging support legs integral to the base plate. A guide mechanism using rails and guide wheels running on the rails, is used to move the plane vertically along a telescopic ram mounted inside the upright column.

5 Claims, 5 Drawing Sheets

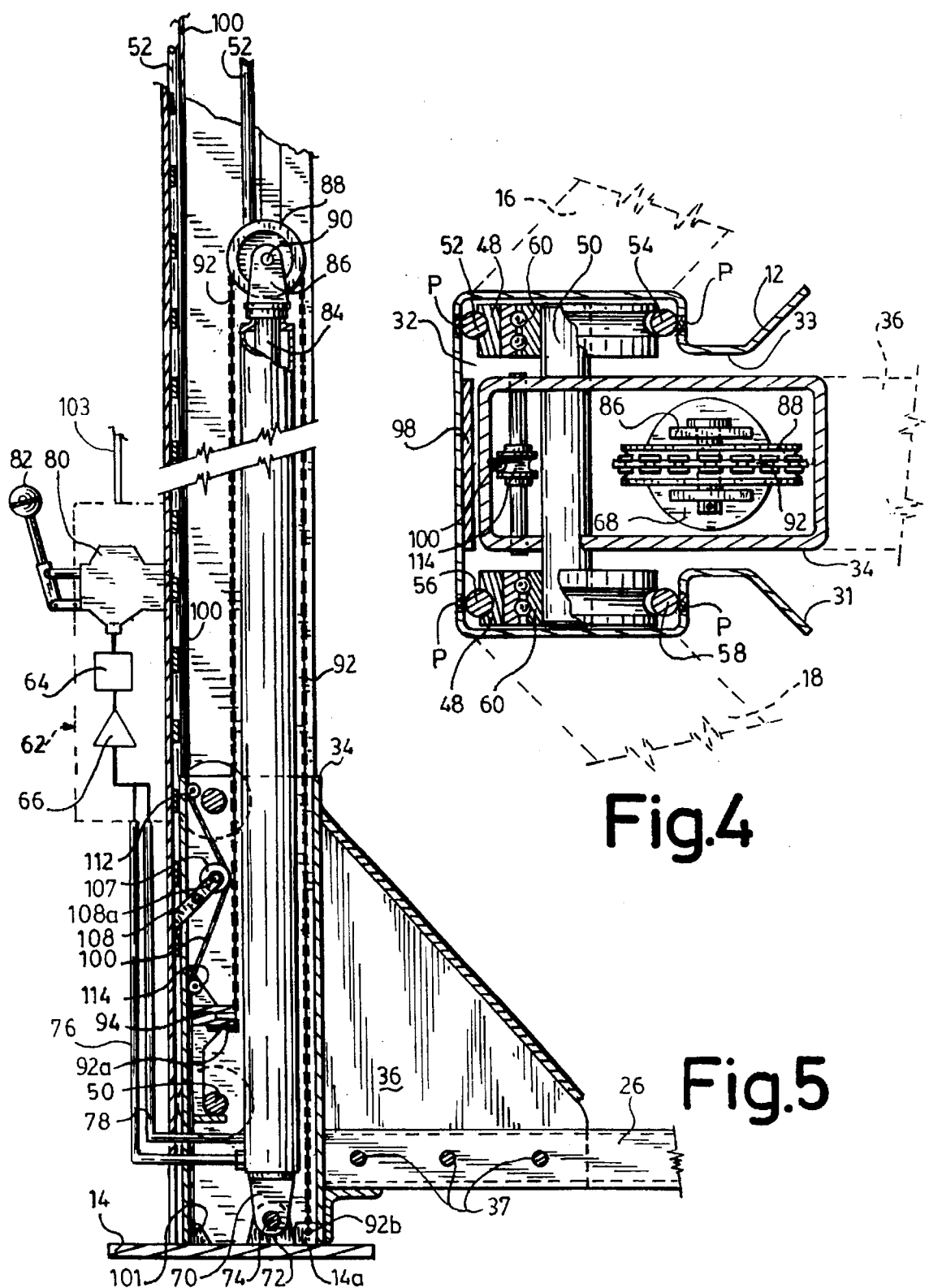

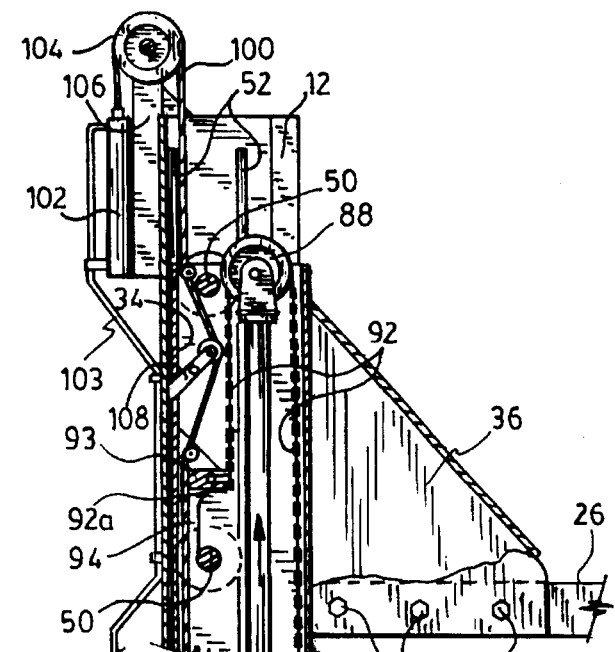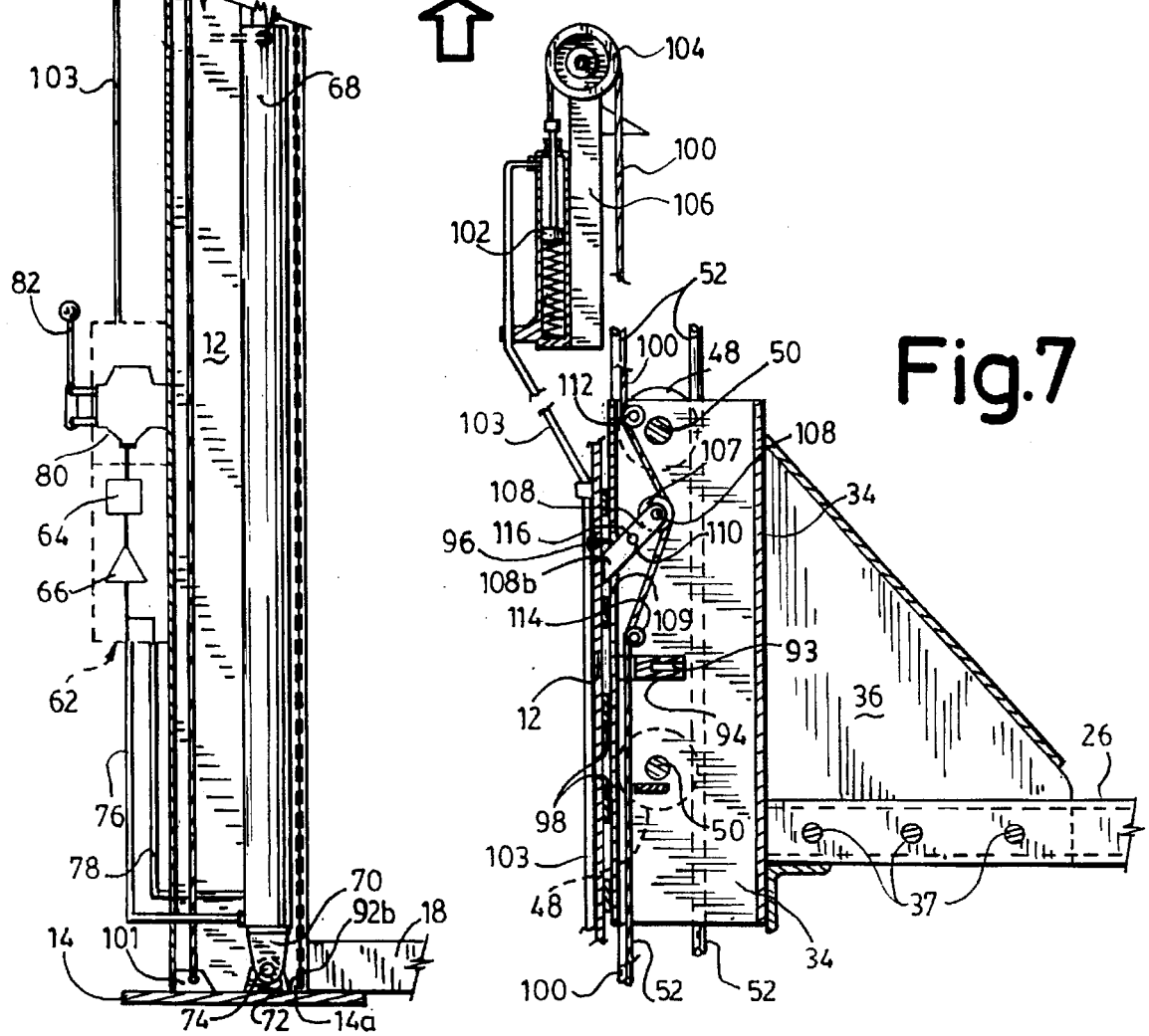

CANTILEVER LIFT ASSEMBLY FOR STATIONARY SMALL AIRCRAFT

FIELD OF THE INVENTION

This invention relates to a jack-like device used inside a hangar for lifting and continuously maintaining a small aircraft above ground, so that another small aircraft can be parked thereunder.

BACKGROUND OF THE INVENTION

There currently exists a number of lifting appliances more particularly designed to lift stationary airplanes. The lifting appliances or lifts usually comprise at least a few upright columns carrying therebetween a horizontally extending aircraft support platform, the platform being vertically movable by means of a lifting device for displacement between a lower limit position, engaging ground, and an upper limit position, in which the platform remains continuously above ground. These lifting appliances, mainly for use with large airplanes, use a concrete platform actuated by means of hydraulic devices in order to provide clearance in wing area, and thus, lay large airplanes side by side in a restricted area, so that their vertically offset respective wings clear one another. All those systems involve either a powerful engine, or are very expensive due to complex components: see U.S. Pat. No. 3,489,297 issued 13 Jan. 1970 to the J.E. Greiner Company.

In other systems, a lift truck is required in order to lift an aircraft supporting pallet over a permanently raised platform forming part of a ground standing frame: see U.S. Pat. No. 3,756,419 issued 4 Sep. 1973 to Charles DEAN.

U.S. Pat. No. 2,843,222 issued 15 Jul. 1958 to the Swiss Julio VILLARS, discloses a lifting assembly for lifting automobiles. This lifting assembly includes a single column rigidly mounted to the ground in upright condition by a base plate. The upright column is made of two cross-sectionally H-shape beams, mounted edgewisely to one another, wherein a closed upright channel of quadrangular cross-section is formed. A sleeve member is slidingly carried by the upright column, being movable lengthwisely thereof via integral rollers under bias from a vertical actuating screw. The actuating screw is energized by an electric motor mounted at the top end of the upright column. A pair of parallel spaced support arms are carried integrally by the hollow slider block, wherein by engaging the underside of an automobile frame, these support arms may vertically displace the automobile upon energizing the electric motor.

In one embodiment of the Villars patent, a Y-shape support member is mounted transversely of the main pair of parallel support legs, with a triplet of bearing surface plates at the ends of the three respective legs of the Y. In another variant, the upright column is carried by a carriage and the lifting member is a platform, wherein the lifting device is transportable.

Due to its design, the Villars lifting device is solely directed to road-going vehicles, and particularly automobiles. Such lifting devices usually require a relatively large power output to lift the loads. Moreover, the configuration of the support arms of the Villars lifting device is also a limiting factor as to its adaptability to alternate type of vehicles.

OBJECTS OF THE INVENTION

The gist of the invention is to provide a vehicle lifting assembly, capable of continuously maintaining such vehicle in raised condition over ground, and being specifically adapted for small aircrafts.

An important object of the invention is to provide a small aircraft ground lifting assembly for use inside a storage hangar, to double up the hangar capacity of storage and thus reduce costs by storing one plane on the said platform at its highest setting while another plane is parked underneath on the ground.

A further object of the invention is that said ground lifting assembly for small aircraft be of small dimensions and of light weight, so as to take up minimal space inside the hangar, and that its ground location inside the hangar be easily adjustable by a single person.

SUMMARY OF THE INVENTION

In accordance with the objects of the invention, there is provided a lifting appliance comprising a lifting member connected to an actuator mechanism housed in an upright column. The lifting assembly comprises a single column and at least one lifting member located on one side of said column and carried by a single slide member connected to the actuated mechanism and rolling along said column. The whole system is supported only by two horizontal legs connected to the baseplate. This appliance addresses the needs of aircraft-specific lifts by the fact that the slider member on the upright column is connected in cantilevered fashion to a platform member specially designed for a small aircraft. The platform member includes three wheel beds in triangularly spaced fashion, for supporting over ground the three wheels of the small aircraft. The specific three bed platform ensures that proper structurally sound aircraft parts are engaged by the lifting platform, and also that proper self-centering of the aircraft relative to its center of gravity will maintain the small aircraft in suitably stable condition during its lifting and at its raised top limit position.

This jack-like elevator is for use inside a storage hangar and lifts a small aircraft in cantilevered fashion above the ground so that another small aircraft can be parked underneath it. The elevator includes an upright column, freely standing on a base plate, and maintained in upright condition by a pair of horizontal diverging support legs integral to the base plate. A guide mechanism using rails and guide wheels running on the rails, is used to move the plane vertically along a telescopic member inside the upright column.

More particularly, the invention relates to a lift assembly for raising and continuously maintaining spacedly over ground a small aircraft in cantilevered fashion so that another small aircraft can be parked underneath the raised aircraft, the aircraft to be raised being of the type having three wheels; said lift assembly including: (a) an elongated column member, having a lengthwise channel; (b) a pair of ground support legs, integrally mounted to one end of said column member in diverging fashion wherein said column member can be maintained in upright condition; (c) a platform assembly including first, second and third wheel support beds, for supporting the three aircraft wheels; (d) an elongated cantilever member having an outer end portion, pivotally mounted to said platform assembly at a location intermediate said support beds, and an inner end portion, rollingly mounted into said column member channel, wherein said cantilever member extends in a fixed downwardly outwardly inclined angular fashion from said column member; (e) power means, for power displacing said cantilever member inner end portion vertically along said column member channel; and (f) an automatic brake means, for releasably locking said carriage at any position along said column member whenever said power means is deactivated.

BRIEF DESCRIPTION OF THE DRAWINGS

FIG. 4 is an enlarged view of the column and associated elements shown in FIG. 3;

FIGS. 5 and 6 are sectional elevational views of the upright column and associated lifting assembly, the top portion of the column being removed in FIG. 5 for clarity of the view, and showing the power actuating mechanism of the upright column at its fully retracted and fully extended conditions, respectively, and also showing the safety braking system mounted inside the upright column;

FIG. 7 is a fragmentary enlarged view of the upper and lower portions of the upright column shown in FIG. 5, with the carriage safety lock system being in its locked condition.

DETAILED DESCRIPTION OF THE EMBODIMENTS OF THE INVENTION

Figure 1:
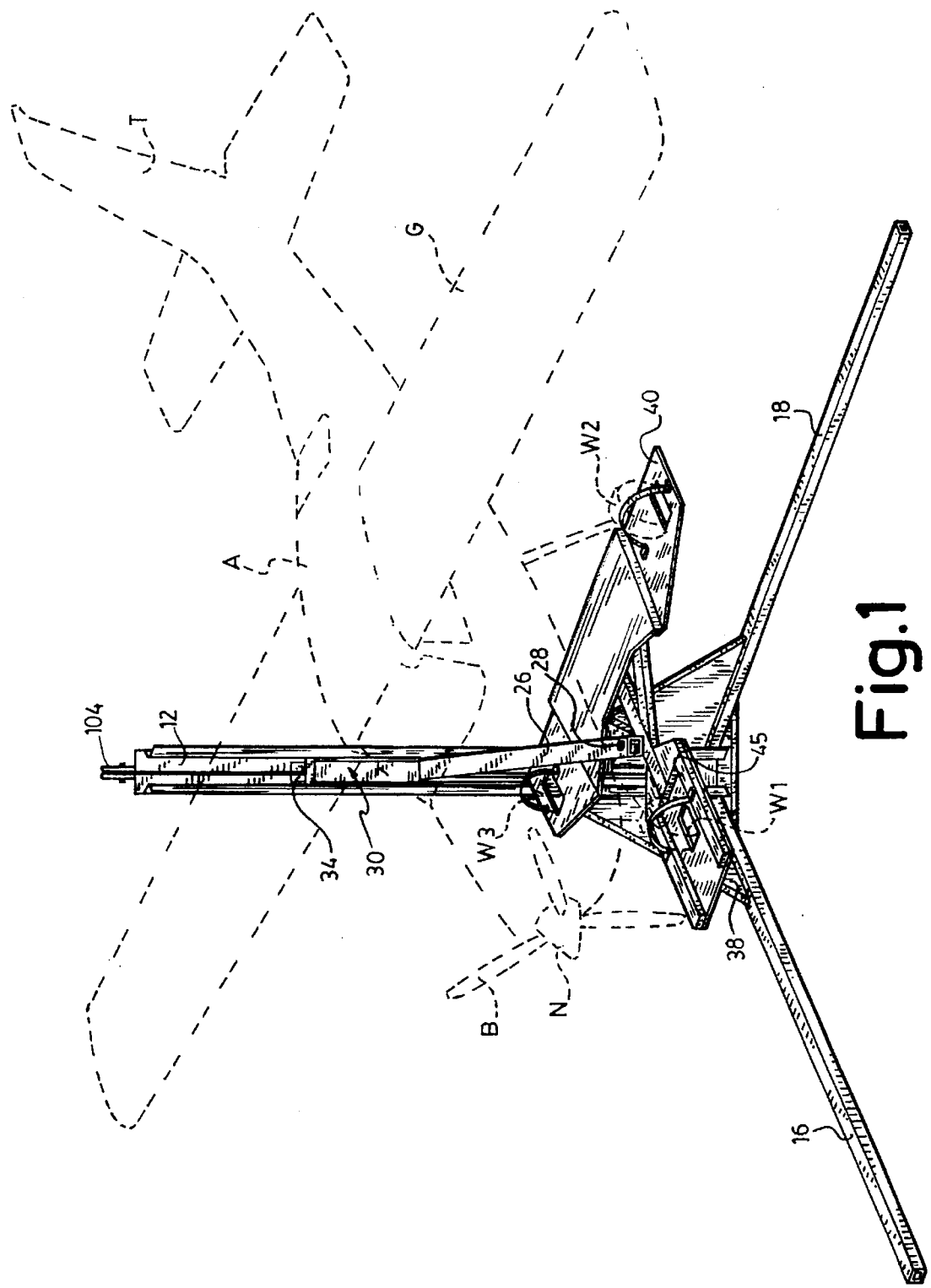
FIG. 1 is a perspective view of a single engine nose-gear light-class aircraft, illustrated in phantom lines, with the landing gear thereof being supported by the three platform beds from a preferred embodiment of aircraft lifting assembly shown in full lines according to the invention.
Figure 2:
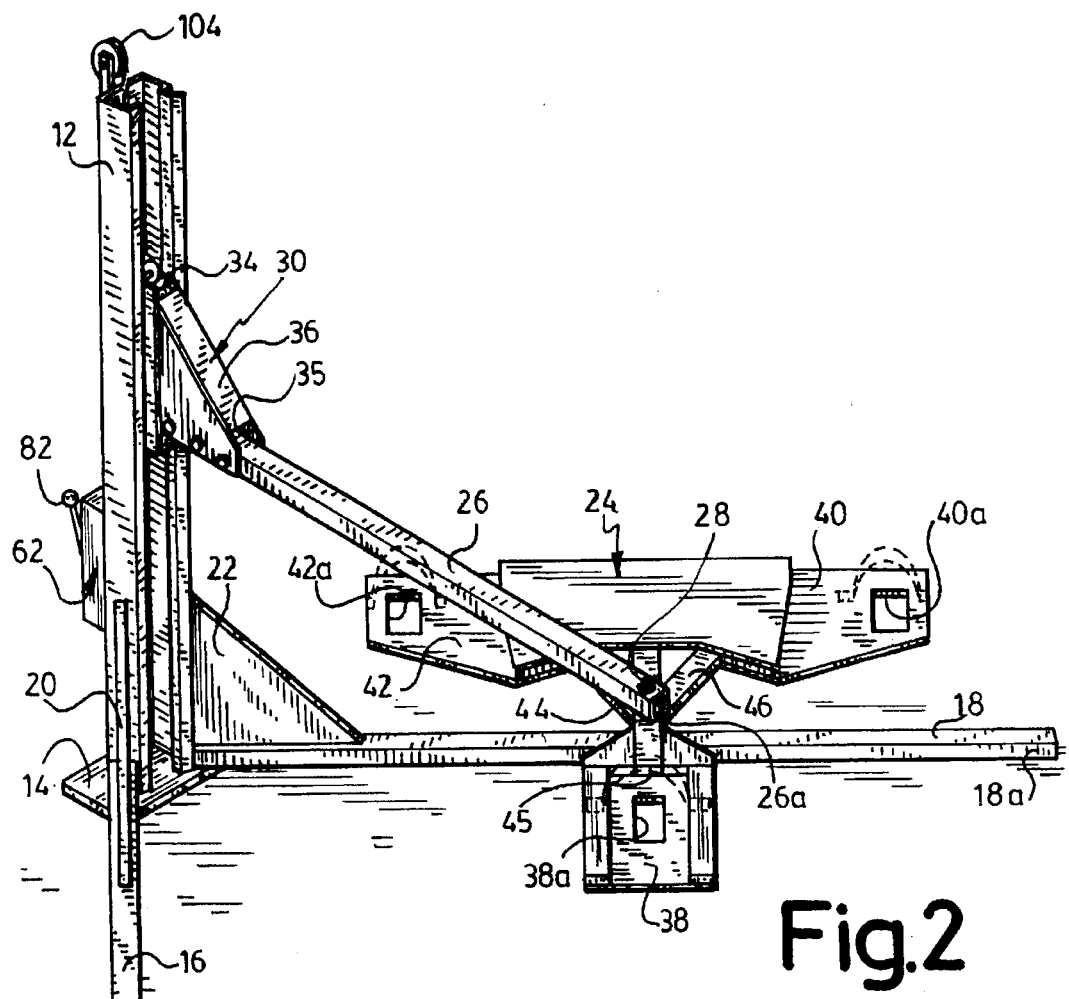
FIG. 2 is an isometric view, at an enlarged scale, of the lifting assembly of FIG. 1.

According to a preferred embodiment of the invention, the lifting appliance 10, illustrated in FIGS. 1 and 2, includes a single elongated upright column 12, rigidly welded at its bottom end transversely to a flat enlarged baseplate 14. A pair of elongated ground support outrigger legs 16, 18, are integrally anchored at their inner ends to the lower end of column 12, and to base plate 14, wherein support legs 16, 18, extend horizontally at about a quarter of a turn angular relation relative to one another. The length of legs 16, 18, will preferably be at least equal to or greater than the height of upright column 12, to provide very good stability of the lifting appliance 10. Preferably, the outer free ends 16a, 18a, of legs 16, 18, carry ground-engaging swivel casters 19, to facilitate handling of the legs 16, 18, over ground. The two ground support legs 16, 18, prevent the lifting device from accidentally tilting over under loading forces.

A pair of triangular upright stay plates 20, 22, are provided integrally to column 12 and to legs 16, 18, respectively, to reinforce and positively maintain the right angle relationship between upright column 12 and ground engaging horizontal legs 16, 18. A platform 24 is carried in cantilevered fashion to the column 12 at the outer end 26a of an elongated cantilever arm 26, by a vertical pivotal mount 28, while the inner end of elongated arm 26 is retained by and rollingly mounted to the upright column 12 by a roller assembly 30.

Figure 3:
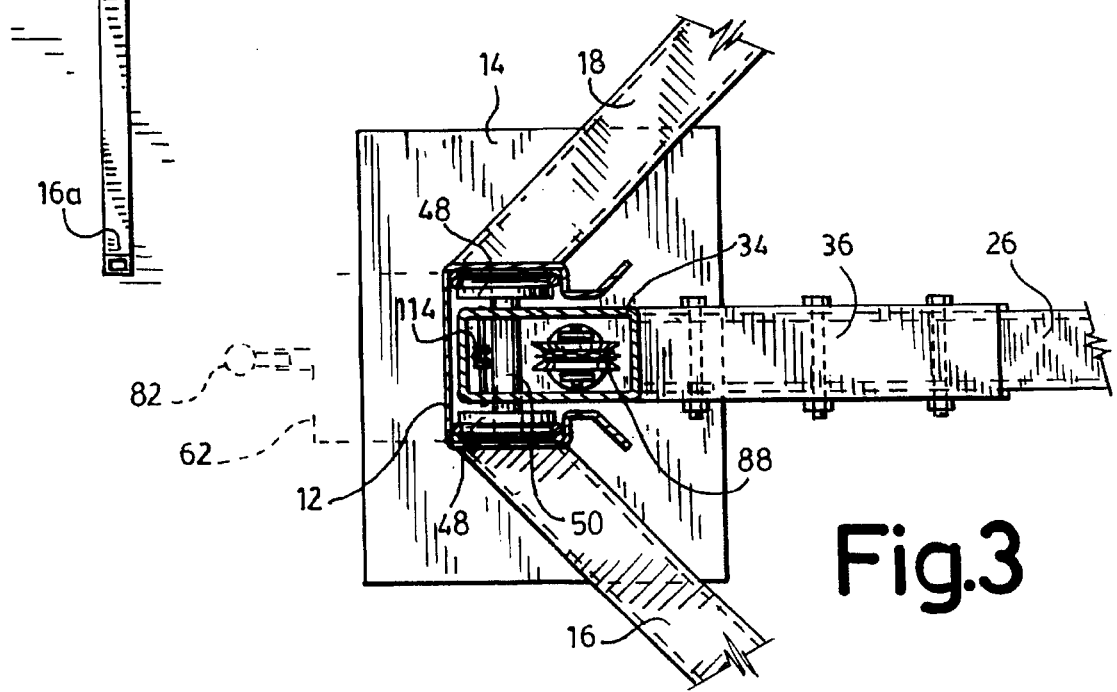
FIG. 3 is a top end view, at an enlarged scale, of the upright column from the lifting assembly of FIG. 1, the horizontal legs and cantilever arm thereof being broken for clarity of the view, the hydraulic power source being schematically shown in dotted lines.

As illustrated in FIG. 3, upright elongated column 12 is preferably made from a rectangular sheet of metallic make, having a cross-sectional shape forming approximately the greek "omega" shape, i.e. letter $\Omega$. This particular shape of the column defines a lengthwise channel 32 (FIG. 4) of generally quadrangular cross-section, for passage of the roll assembly 30, a funnel shape mouth 31, opening into the channel 32, and a diametrally smaller annular section 33, intermediate mouth 31 and channel 32. Thanks to its $\Omega$ cross-sectional shape, channel 32 provides structural resistance against bending and buckling forces under the aircraft weight load applied on platform 24.

Roll assembly 30 includes a carriage 34, being rollingly engaged into the lengthwise channel 32 of column 12 for displacement lengthwisely thereof, said carriage 34 having an outer portion projecting through the column neck 33 and funnel mouth 31 and connected to arm 26 by means of a rigid hollow connecting member 36. Carriage 34 has a length representing a small fraction of the total length of upright column 12, while connecting member 36 preferably has a triangular shape with its large vertical side anchored to carriage 34 and its bottom side forming a horizontal outwardly opening pocket 35 (FIG. 2) releasably engaged by the corresponding end portion of tubular arm 26. Preferably, tubular arm 26 is telescopically mounted to hollow connecting member 36 thanks to a number of through bolts 37 extending through the underside of triangular connector 36 and through the body of tubular arm 26 located inside hollow connector 36; hence, by partially extending or retracting elongated arm 26 from or into casing 36, the total length of cantilever arm 26 can be adjusted, to adapt to aircrafts of various sizes.

As illustrated in FIGS. 1 and 2, the aircraft supporting platform 24 consists of three spaced apart, rigid, flat surface bearing beds 38, 40 and 42, being spacedly interconnected in triangularly disposed fashion by means of support legs 44, 45 and 46. Legs 44–46 may be optionally telescopic, to provide adjustable spreading apart distance between the three wheel support beds 38, 40 and 42.

Support legs 44–46 are disposed in diverging fashion and merge about superimposed end portions thereof, where vertical pivot stud 28 is pivotally connected. Pivot stud 28 positively interconnects legs 44–46 to the outer end 26a of cantilever arm 26, for pivotal motion of platform 24 about the vertical axis of stud 28. Accordingly, the whole platform 24 is rotatably mounted about the outer end 26a of cantilever arm 26. Moreover, it is further possible to get a few balanced movements of cantilever arm 26 along the vertical pin axis 28, so as to enable the platform 24 to adapt to the underlying ground landscape or flooring relief.

Figure 8B:
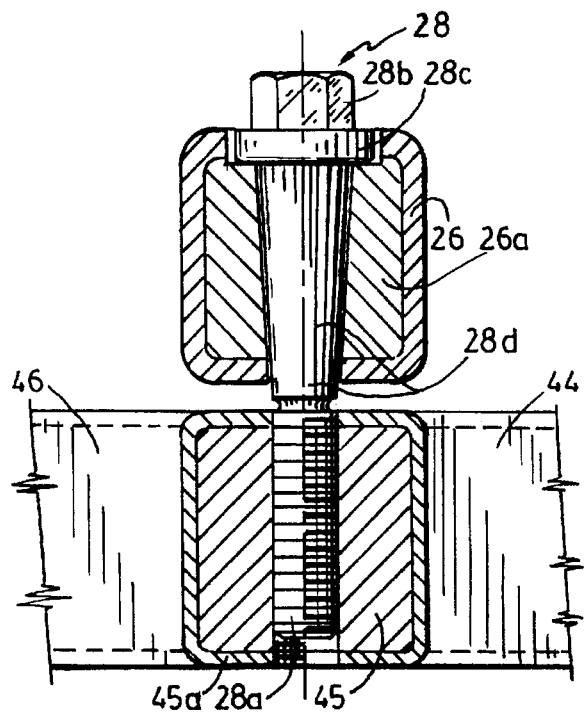
FIGS. 8A and 8B are cross-sectional views of the platform bed pivot mount which is connected to the cantilever support arm, sequentially showing the ground laying position and the raised position respectively of the aircraft-supporting platform.
Figure 8A:
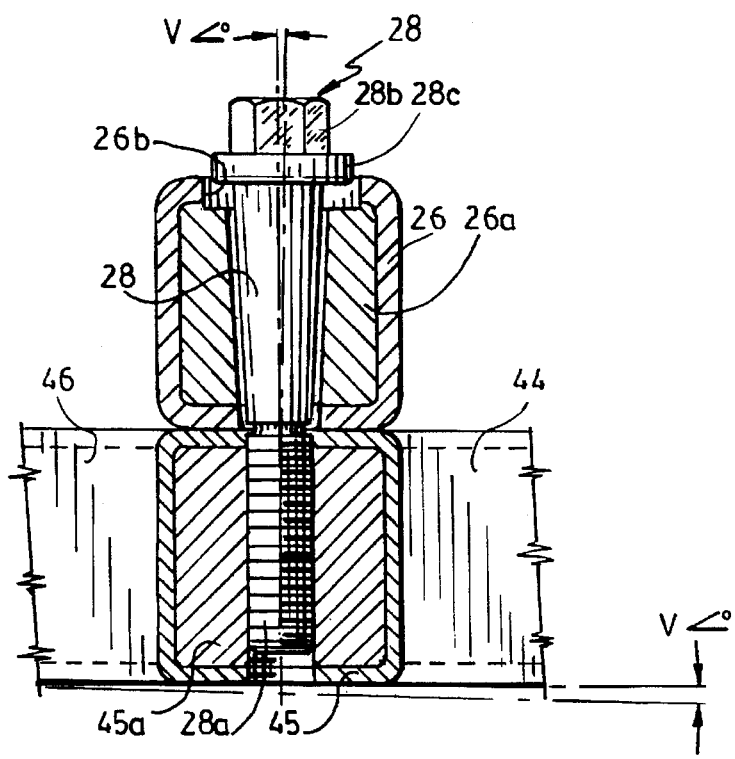

FIGS. 8A and 8B show how the cantilever arm 26 is connected to the platform elements 44–46 with the vertical pivot mount 28, and also suggest how the platform 38, 40, 42, can be made to rotate freely around vertical pivotal axis 28 and how the platform 38, 40, 42, can be made to slightly tilt away from its horizontal plane to adapt to ground surface irregularities. More particularly, pivot mount 28 consists of an elongated stud having a threaded end portion 28a, threadingly engaging vertically through platform bed leg 45 across the leg core 45a, an enlarged nut portion 28b—including an annular radially enlarged inner rim 28c—at its end opposite threaded portion 28a, and an intermediate unthreaded conical portion 28d engaging freely through a complementarily shaped channel made through the outer free end portion 26a of cantilever arm 26. The top end of cantilever end portion 26a includes an annular recess 26b, forming a seat for receiving stud rim 26c upon the cantilever arm 26 being raised.

Accordingly, the outer end 26a of elongated cantilever arm 26 is movable vertically relative to platform leg 45, between a first released limit position, illustrated in FIG. 8B and in which cantilever arm outer end 26a abuts simply by its own weight over platform bed leg 45, and a second raised limit position, illustrated in FIG. 8A, and in which cantilever arm outer end 26a is raised spacedly from leg 45 by a fixed gap wherein cantilever arm outer end 26a slides along stud conical portion 28d and wherein cantilever arm annular seat 26b abuts against stud rim 28c.

Each generally flat bed 38, 40, 42, is sized for supporting one of the three respective wheels w1, w2, w3, of a single engine small aircraft A, with nose wheel w1 being supported by front bed 38, and with the pair of main landing gear wheels w2, w3, being supported by laterally opposite beds 40 and 42, where telescopingly adjustable connecting members 44, 45 and 46 would be used, thus would enable spacing adjustment between the three bearing beds 38, 40 and 42, to fit small aircrafts of various landing gear width, and size and shape of the aircraft A. Preferably, and as illustrated in FIGS. 1–2, each bed 38, 40 and 42, includes wheel securing means, e.g. a loop binder strap attached to platform 24 at both ends, and\or either a recess or an aperture 38a, 40a, 42a, respectively, for receiving the corresponding wheels w1, w2, w3, to "sink" partially thereinto to thus prevent accidental rolling motion of the wheels outwardly of the corresponding support bed 38–42 and downwardly from the platform 24. With the binder straps, and the recesses\apertures 38a, 40a, 42a, all aircraft wheels w1, w2, w3, are "locked" in place by the fact that each such wheel fall into its respective bed cavity when the platform 24 is raised up. Thus it is possible to prevent the plane from falling off the platform 24 while the system is going upward.

The layout of platform 24 is such that, upon nose gear w1 being supported over bed 38, and upon main landing gear w2, w3 being supported over beds 40 and 42, upright column 12 extends ahead of the main wing G of the aircraft A and laterally of its front engine N. Hence, power operation of roll assembly 30 in column 12 can be done safely by an operator reaching column 12 away from the front propellor blades B. In FIG. 1, the small aircraft is of the type having wings G mounted to the top of the fuselage—as for most single-engine "Cessna" make aircrafts—, but the platform 24 could easily be adapted with minimal or no changes, to be used for aircrafts with wings G mounted to the flooring of the fuselage—as for most single-engine "Piper" and "Beechcraft" make aircrafts. Moreover, although the aircraft illustrated in FIG. 1 is of the type having a nose wheel w1, other aircrafts of the type having a tail wheel instead of a nose wheel, would be envisioned to be within the scope of the present invention; the front bed 38 would then become the "rear" bed, with the upright column 12 extending ahead of the tail assembly T of the aircraft, and the distance between bed 38 and the pair of lateral beds 40, 42, being substantially increased by the optional telescopic means of the adjustment members 44–46 to reflect the greater distance therebetween.

The bending load and the shear load from lifting the aircraft over platform 24 are handled by the carriage 34 located into the column 12. As illustrated in FIGS. 4 and 5, the carriage 34 consists of a sleeve member carried by four idle rollers 48 assembled in two pairs along two parallel dead axles 50 which extend through the carriage 34. The dead axles 50 are made of tempered steel round shaft in order to handle all applied loads as shown in FIG. 4. Those dead axles 50 extend through and are fixedly anchored to the interior part of the carriage 34 as shown in FIG. 4, and locked by means of standard retaining rings (not shown) located on the side of the carriage 34.

A loose axle adjustment is provided to enable the dead axles 50 to slightly rotate around their own axis and, by this fact, to work as a suspension when the wheels 48 are rolling along the column 12. As illustrated in FIG. 4, to guide the displacement of each pair of superimposed wheel 48, 48, on each lateral side of column 12, there is provided a first pair of front and rear upright facing rails 52 and 54, on one lateral side, and a second pair of front and rear upright facing rails 56 and 58, on the opposite lateral side; each rail 52, 54, 56, 58, being anchored, preferably by plug-welding P, in each lateral corner of the column 12, and extending all along the length of column 12.

The four wheels 48 are made of high resistant steel alloy to handle typical applied loads, and each consists of a round disc grooved all around its circumference and comprising a bored hole drilled in its centre to accommodate a pair of bearing assembly 60. Each wheel 48 includes accordingly a pair of deep groove radial ball bearings 60, also mounted around each end of shaft 50, in a "back to back" configuration, to handle both thrust axial loads and radial loads. This configuration appears in all four wheels 48, so a total of four pairs of bearings 60 are used (only two pairs are shown in FIG. 4).

A small clearance is left between the inner groove diameter of the circumference of wheel 48 and the gap existing between the two rails 52 and 54, or 56 and 58, into which the wheel 48 is engaged (so that it not be possible to squeeze the said wheel and prevent damage to the said wheel 48 and said rails 52, 54, or 56 and 58). Hence, such an assembly also enables the wheel suspension system to work properly.

As shown in FIGS. 5 and 6, the lifting device 10 uses hydraulic power to bias the carriage 34 upwardly or downwardly. A hydraulic power unit 62 is fixedly mounted to an intermediate section of the back of column 12, to provide required power. The hydraulic power unit 62 includes a constant flow gear pump 64 actuated by an electric motor 66 providing required pressure and flow to a double acting cylinder 68. The elongated double acting cylinder 68 is mounted inside column 12, being pivotally mounted in upright condition at its bottom end to baseplate 14, via a swivel assembly including an upper yoke 70, integral to cylinder 68, a lower ear 72, integral to base plate 14, and a horizontal pivot mount 74, interconnecting elements 70 and 72, in order to avoid bending loads across the length of cylinder 68. Hydraulic power is transmitted from the power unit 62 to the double acting cylinder 68 by means of flexible hydraulic hoses 76 and 78, as shown in FIGS. 5 and 6.

The hydraulic power from power unit 62 is controlled by a four way directional valve 80 manually operated with handle 82. Depending on the lever position of handle 82, the carriage 34 will move upward, downward, or will remain stationary. Preferably, a conventional spring-back mechanism, not shown, automatically biases handle 82 to its stationary carriage condition. The hydraulic power unit 62 preferably also features a pressure relief valve, not shown, which prevents the system from being exposed to an excessive load. This safety valve must be set so that beyond a threshold load level, the platform 12 will not be lifted by the lifting device 10.

The double acting cylinder 68 is located into the empty space inside the hollow carriage tubing 34, so that it can be possible for the carriage 34 to move along the said cylinder 68 without interference. The piston rod 84 of the double acting cylinder 68 carries at its top end a yoke 86. A steel pulley 88 is freely journalled to yoke 86 by horizontal pivot axle 90. A power transmission roller chain 92 is trained around pulley 88, with one end thereof 92b being fixed to an ear 14a integral to the baseplate 14, while the other end thereof 92a is anchored to a point 94 of a plate 93 mounted transversely and integral to a lower portion of cylinder 68 on the side of column 12 opposite ear 14a.

Hence, when the double acting cylinder 68 extends vertically by a one foot distance, there results a two feet displacement of the carriage 34 in the upward direction. This phenomena is due to the fact that there are two vertical races of chain 92 along cylinder 68 (i.e. one on each lateral side of the pulley 88). So a one foot vertical displacement of the pulley 88 (due to a one foot extension of the cylinder 68) means a displacement of two feet of roller chain 92 around the pulley 88, causing also a displacement of carriage 34 of two feet. In other words, the required extension of the double acting cylinder 68 is exactly half of the required height displacement of the plane located on the platform 24 actuated by the motion of carriage 34—hence, a lower power output source being required to operate lifting device 10.

The lifting device 10 further preferably features a safety brake system in order to prevent accidental fall of the raised platform 24 due to a hydraulic line fluid leak or a hydraulic power system failure or accidental shut-down. The load should imperatively also be mechanically locked in the chosen lifted position when the system is not used. The hydraulic pressure should not be used to maintain the highest setting of the plane for a long time, since otherwise, it would mean that the lifting device 10 could fall at any moment if a fluid seal would fail under pressure applied. Obviously a safety system must be installed to provide safe operation to operators and avoid damages and even bodily injuries.

As shown in FIGS. 4, 6 and 7, a safety brake system 96 is provided on this aircraft lifting device. This safety brake system 96 includes a steel ladder 98 welded against the interior face of the rear wall of column 12, along the full length of column 12. A thin steel wire 100 is trained around a transfer pulley 104, journalled to a yoke 106 carried on top of the column 12, for pivotal motion around a horizontal axis. Wire 100 is operatively connected at one end to a hydraulic ram 102, and at the other end to an ear 101 integral to ground base plate 14. Wire 100 is used to engage or disengage the brake system 96 by means of the single acting linear actuator ram 102, being of the spring return type. A hydraulic line 103 operatively interconnects hydraulic ram 102 to the hydraulic control power unit 62, as shown in FIG. 6.

This thin steel wire 100 is also trained on a counterweight pulley 107 (FIG. 7), being welded to the inner end 108a of a solid steel elongated rectangular bar 108. Elongated bar 108 is pivotally mounted at its intermediate section to carriage 34 by horizontal pivot axle 110, axle 110 being located slightly above cable anchor plate 93. Bar 108 includes an outer end 108b, opposite inner end 108a, and adapted to extend through a rear aperture 109 made in carriage 34 and to frictionally abut transversely against the integral inner ladder 98 of the column 12. Two miniature idle pulleys 112, 114, fixed by horizontal shafts in the inside back of the carriage 34 over and below pivot bar 108, are trained by and act as guides for wire 100 when the said carriage 34 starts moving.

The purpose of small cylinder 102, is to produce, by its actuation, a force that bends the thin steel wire 100, and hence, displacement of the counterweight pulley 107 to move in counterclockwise motion (relative to the view of FIG. 7) the solid rectangular bar 108, so that its outer end 108b move away from the ladder groove, thus disengaging the brake 96, wherein the carriage 34 can easily go down without any resistance.

That is to say, during vertical displacement of carriage 34 under power from hydraulic power unit 62, solid lever arm 108 pivots counterclockwise around pivot 110, so that its outer free end 108b clear the wall of column 12 and move completely inside of carriage 34, thus releasing ladder 98 and clearing carriage bore 98. Lever arm 108 will pivot counterclockwise, due to the bias of cable 100 which, under hydraulic pulling force from power source 62, will move pulley 107 upwardly. A return coil spring and integral to pivot mount 110, will automatically return lever arm 108 to its locked condition (shown in FIG. 7), by clockwise pivotal motion of bar 108, once cable pressure has been released, thus acting as a locking cam into the ladder 98.

One may say that the system could have been disengaged in a simpler way. But it would mean that the operator would have the choice to engage or not the brake system. Safety, at this point, only depends on the reflex or execution speed of the operator to reengage the brake system if a problem occurs. It is not acceptable when loads involved—such as small aircrafts weighting in the range of approximately one to twelve thousand pounds—are considered as dangerous. The brake system 96 must be engaged automatically.

In this invention, one should note that the single acting cylinder 102 always disengage the brake system 96, as long as the pump 64 builds an operating pressure into said cylinder 102, via the wire 100.

If the pump 64 is shut down or if a seal breaks (creating a leak), this would mean that the operating pressure could not be kept in the system. It would also mean an important pressure loss which would result as a loss of pressure in the cylinder 102 and thus result as a total release of tension applied to the thin wire 100.

When the wire tension is released due to a leak problem or even an electrical power failure, then the counterweight pulley 107 automatically rotates clockwise (in FIG. 7) around the solid bar horizontal axle 110, under bias from a helicoidal spring 116 mounted around axle 110. Accordingly, the solid bar 108 is pushed in between two horizontal steps of the ladder 98 as shown on FIG. 7. In this case the brake system 96 is automatically engaged.

It is noted that the whole braking system could also be actuated by mechanical means such as an actuating screw or cam system. Also, the whole braking system should be considered as a tool or a mobile device which could also be alternately fixed with anchors in a concrete slab, thus, it will be possible to remove the legs (outriggers) acting as supports and preventing the lifting device 10 from tilting over; thus defining the system as a permanently fixed machinery, as an alternate embodiment.

I claim:

1. A lift assembly for raising and continuously maintaining spacedly over ground a small aircraft in cantilevered fashion so that another small aircraft can be parked underneath the raised aircraft, the aircraft to be raised being of the type having three landing gear wheels; said lift assembly including:

(a) an elongated column member, having a lengthwise channel, with a lengthwise mouth;

(b) a pair of ground support legs, integrally mounted to one end of said column member in diverging fashion wherein said column member can be maintained in upright condition;

(c) a platform assembly including first, second and third wheel support beds, each of said wheel support beds having a top surface for supporting the aircraft wheels;

(d) an elongated cantilever member having an outer end portion, pivotally mounted to and retaining said platform assembly at a location intermediate said support beds, and an inner end portion, rollingly mounted through said column mouth and into said column member channel, wherein said cantilever member extends in a downwardly outwardly inclined angular fashion from said column member;

(e) power means, for power displacing said cantilever member inner end portion vertically along said column member channel; and (f) automatic brake means, for releasably locking said cantilever member inner end portion to said column at any position along said column member whenever said power means is deactivated.

2. An aircraft lift assembly as in claim 1, wherein said column member is of $\Omega$ shape in cross-section.

3. An aircraft lift assembly as in claim 1, further including wheel securing means in said wheel beds, for preventing accidental horizontal rolling motion of said aircraft during vertical motion thereof by said lift assembly.

4. An aircraft lift assembly as in claim 3, wherein said wheel securing means consists of means selected from the group comprising a cavity, an aperture, and a binder strap attachment, integral to the top surface of said wheel beds, said cavity or aperture sized for partial engagement by the wheels, each said binder strap sized for circumscribing a corresponding wheel.

5. An aircraft lift assembly as in claim 1, further including connecting means, for adjustably mounting said first to third wheel support beds to one another in selected spaced apart configuration, for fitting aircrafts of different widths.

* * * * *